US012684008B2

(12) United States Patent
Kohout et al.

(10) Patent No.:  US 12,684,008 B2
(45) Date of Patent:       Jul. 14, 2026

(54) ANALYZING ENCRYPTED TRAFFIC BEHAVIOR USING CONTEXTUAL TRAFFIC DATA

(71) Applicant: Cisco Technology, Inc., San Jose, CA (US)

(72) Inventors: Jan Kohout, Roudnice Nad Labem (CZ); Blake Harrell Anderson, Chapel Hill, NC (US); Martin Grill, Prague (CZ); David McGrew, Poolesville, MD (US); Martin Kopp, Beroun (CZ); Tomas Pevny, Praha-Modrany (CZ)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/441,414

(22) Filed: Feb. 14, 2024

(65) Prior Publication Data

US 2024/0187444 A1     Jun. 6, 2024

Related U.S. Application Data

(63) Continuation of application No. 17/873,544, filed on Jul. 26, 2022, now Pat. No. 11,936,683, which is a (Continued)

(51) Int. Cl.
*H04L 9/40*          (2022.01)
*G06N 20/00*         (2019.01)
                     (Continued)

(52) U.S. Cl.
CPC ......... *H04L 63/1441* (2013.01); *G06N 20/00* (2019.01); *H04L 41/0686* (2013.01);
                     (Continued)

(58) Field of Classification Search
CPC ............. H04L 63/0428; H04L 63/1408; H04L 63/1425; H04L 16/1433; H04L 16/1441; H04L 16/30; H04L 16/306
See application file for complete search history.

(56)                References Cited

U.S. PATENT DOCUMENTS 7,634,811 B1     12/2009 Kienzle et al.
7,778,194 B1      8/2010 Yung
                  (Continued)

FOREIGN PATENT DOCUMENTS

WO        2015128609 A1     9/2015

OTHER PUBLICATIONS

Anderson B., et al., "Deciphering Malware's use of TLS (Without Decryption)," arxiv.org, Cornell University Library, 201 Olin Library Cornell University Ithaca, NY 14853, Jul. 6, 2016, 17 pages, XP080712441.

(Continued)

*Primary Examiner* — Daniel B Potratz
(74) *Attorney, Agent, or Firm* — Lee & Hayes, P.C.

(57)                ABSTRACT

In one embodiment, a device in a network detects an encrypted traffic flow associated with a client in the network. The device captures contextual traffic data regarding the encrypted traffic flow from one or more unencrypted packets associated with the client. The device performs a classification of the encrypted traffic flow by using the contextual traffic data as input to a machine learning-based classifier. The device generates an alert based on the classification of the encrypted traffic flow.

20 Claims, 8 Drawing Sheets

Related U.S. Application Data continuation of application No. 17/029,156, filed on Sep. 23, 2020, now Pat. No. 11,451,578, which is a continuation of application No. 15/286,728, filed on Oct. 6, 2016, now Pat. No. 10,805,338.

(51) Int. Cl.
| | |
|---|---|
| *H04L 41/0686* | (2022.01) |
| *H04L 47/2441* | (2022.01) |
| *G06N 20/20* | (2019.01) |

(52) U.S. Cl.
CPC ...... *H04L 47/2441* (2013.01); *H04L 63/0428* (2013.01); *H04L 63/1416* (2013.01); *H04L 63/1425* (2013.01); *H04L 63/145* (2013.01); *H04L 63/168* (2013.01); *G06N 20/20* (2019.01)

(56) References Cited

U.S. PATENT DOCUMENTS

| | | | | |
|---|---|---|---|---|
| 8,539,221 | B2 * | 9/2013 | Tremblay | H04L 63/0428 |
| | | | | 706/46 |
| 8,549,645 | B2 | 10/2013 | Tang et al. | |
| 8,699,357 | B2 | 4/2014 | Deshpande et al. | |
| 8,832,007 | B2 | 9/2014 | Nahum et al. | |
| 9,038,178 | B1 | 5/2015 | Lin | |
| 9,043,919 | B2 | 5/2015 | Wyatt et al. | |
| 9,055,093 | B2 | 6/2015 | Borders | |
| 9,374,385 | B1 | 6/2016 | Falkowitz et al. | |
| 9,846,780 | B2 | 12/2017 | Tonn et al. | |
| 10,212,176 | B2 | 2/2019 | Wang | |
| 10,361,931 | B2 | 7/2019 | Sokolik et al. | |
| 10,659,478 | B2 * | 5/2020 | Heilig | H04L 63/1408 |
| 10,778,700 | B2 * | 9/2020 | Azvine | H04L 63/1425 |
| 10,805,338 | B2 | 10/2020 | Kohout et al. | |
| 2007/0056046 | A1 | 3/2007 | Claudatos et al. | |
| 2011/0142240 | A1 | 6/2011 | Yoon et al. | |
| 2012/0287922 | A1 | 11/2012 | Heck et al. | |
| 2016/0269448 | A1 | 9/2016 | Jayaraman et al. | |
| 2017/0237777 | A1 * | 8/2017 | Joch | H04L 63/1408 |
| | | | | 713/152 |
| 2018/0115567 | A1 * | 4/2018 | El-Moussa | H04L 63/1416 |
| 2020/0327252 | A1 | 10/2020 | McFall et al. | |

OTHER PUBLICATIONS

Bocchi E., et al., "MAGMA Network Behavior Classifier for Malware Traffic," Mar. 31, 2016, 19 Pages.
Conti M., et al., "Analyzing Android Encrypted Network Traffic to Identify User Actions", IEEE Transactions on Information Forensics and Security, vol. 11, No. 1, Jan. 1, 2016, pp. 114-125.
Extended European Search Report for European Application No. 17194010.9, mailed Feb. 14, 2018, 10 Pages.
Husák M., et al., "HTTPS Traffic Analysis and Client Identification Using Passive SSL/TLS Fingerprinting," EURASIP Journal on Information Security, SpringerOpen Journal, Feb. 2016, 14 Pages.
Krzanowski R., "Burst (of Packets) and Burstiness," 66th IETF—Montreal, Quebec, Canada, Oct. 7, 2006, pp. 1-24, [Retrieved on Jan. 31, 2018]. Retrieved from URL: https://www.ietf.org/proceedings/66/slides/ippm-10.pdf.
Searchmetrics: "HTTPS Encryption—What is the impact of TLS/SSL on Rankings?," Mar. 3, 2015, pp. 1-16, Retrieved from URL: https://blog.searchmetrics.com/us/https-vs-http-website-ssl-tls-encryption-ranking-seo-secure-connection/.
Warmer M., "Detection Of Web Based Command & Control Channels" University of Twente, Nov. 2011, 85 Pages.
Wikipedia: "Network Behavior Anomaly Detection (NBAD)," Aug. 9, 2016, pp. 1-3, Retrieved from URL: https://en.wikipedia.org/wiki/Network_Behavior_Anomaly_Detection.
Wireshark: "The "Capture Options" dialog box," Jun. 18, 2016, 3 Pages, [Retrieved on Jan. 31, 2018] Retrieved from URL: https://web.archive.org/web/20160618040335/https://www.wireshark.org/docs/wsug_html_chuncked//ChCapCaptureOptions.html.
Wright C.V., et al., "On Inferring Application Protocol Behaviors in Encrypted Network Traffic," Journal of Machine Learning Research, Submitted On Mar. 2006, Revised On Sep. 2006, Published On Dec. 2006, vol. 7, pp. 2745-2769.
Yen T., "Detecting Stealthy Malware Using Behavioral Features in Network Traffic" Department of Electrical and Computer Engineering Carnegie Mellon University, Aug. 2011, 123 Pages.

* cited by examiner

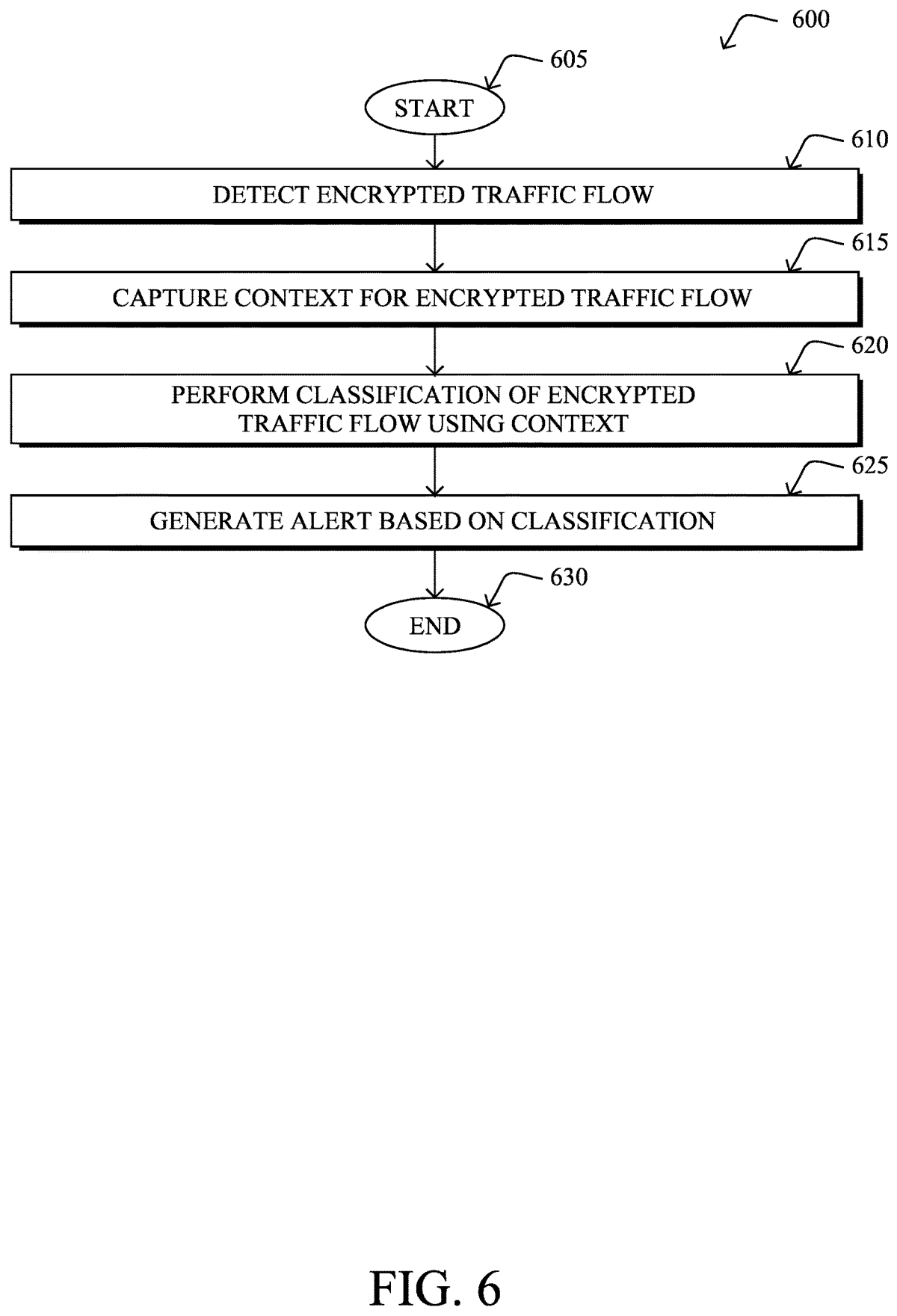

600

605

START

610

DETECT ENCRYPTED TRAFFIC FLOW

615

CAPTURE CONTEXT FOR ENCRYPTED TRAFFIC FLOW

620

PERFORM CLASSIFICATION OF ENCRYPTED
TRAFFIC FLOW USING CONTEXT

625

GENERATE ALERT BASED ON CLASSIFICATION

630

END

FIG. 6

ANALYZING ENCRYPTED TRAFFIC BEHAVIOR USING CONTEXTUAL TRAFFIC DATA

CROSS-REFERENCE TO RELATED APPLICATION

This application is a Continuation of U.S. patent application Ser. No. 17/873,544, filed on Jul. 26, 2022, U.S. patent application Ser. No. 17/029,156, filed on Sep. 23, 2020 and U.S. patent application Ser. No. 15/286,728, filed on Oct. 6, 2016, all entitled ANALYZING ENCRYPTED TRAFFIC BEHAVIOR USING CONTEXTUAL TRAFFIC DATA, by Kohout, et al., the entire contents of which are incorporated herein by reference.

TECHNICAL FIELD

The present disclosure relates generally to computer networks, and, more particularly, to analyzing encrypted traffic behavior using local context.

BACKGROUND

Malicious network traffic can take many different forms. For example, some traffic may seek to overwhelm a service by sending a large number of requests to the service. Such attacks are also sometimes known as denial of service (DOS) attacks. Other forms of malicious traffic may seek to exfiltrate sensitive information from a network, such as credit card numbers, trade secrets, and the like. Typically, such traffic is generated by a client that has been infected with malware. Thus, a further type of malicious network traffic includes network traffic that propagates the malware itself.

Intrusion protection systems (IPS), firewalls, and flow monitoring systems generally attempt to detect and block malicious traffic, whenever possible. However, in recent years, the amount of encrypted network traffic has increased considerably. Notably, with the advent of transport layer security (TLS) and other security mechanisms, many websites are now encrypting even traditional webpage data. This presents certain challenges to security systems as the contents of the traffic may not be available for analysis and pattern matching is generally inapplicable to encrypted traffic.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 6 illustrates an example simplified procedure for analyzing encrypted traffic behavior using contextual traffic data.

DESCRIPTION OF EXAMPLE EMBODIMENTS

Overview

Figure 1A:
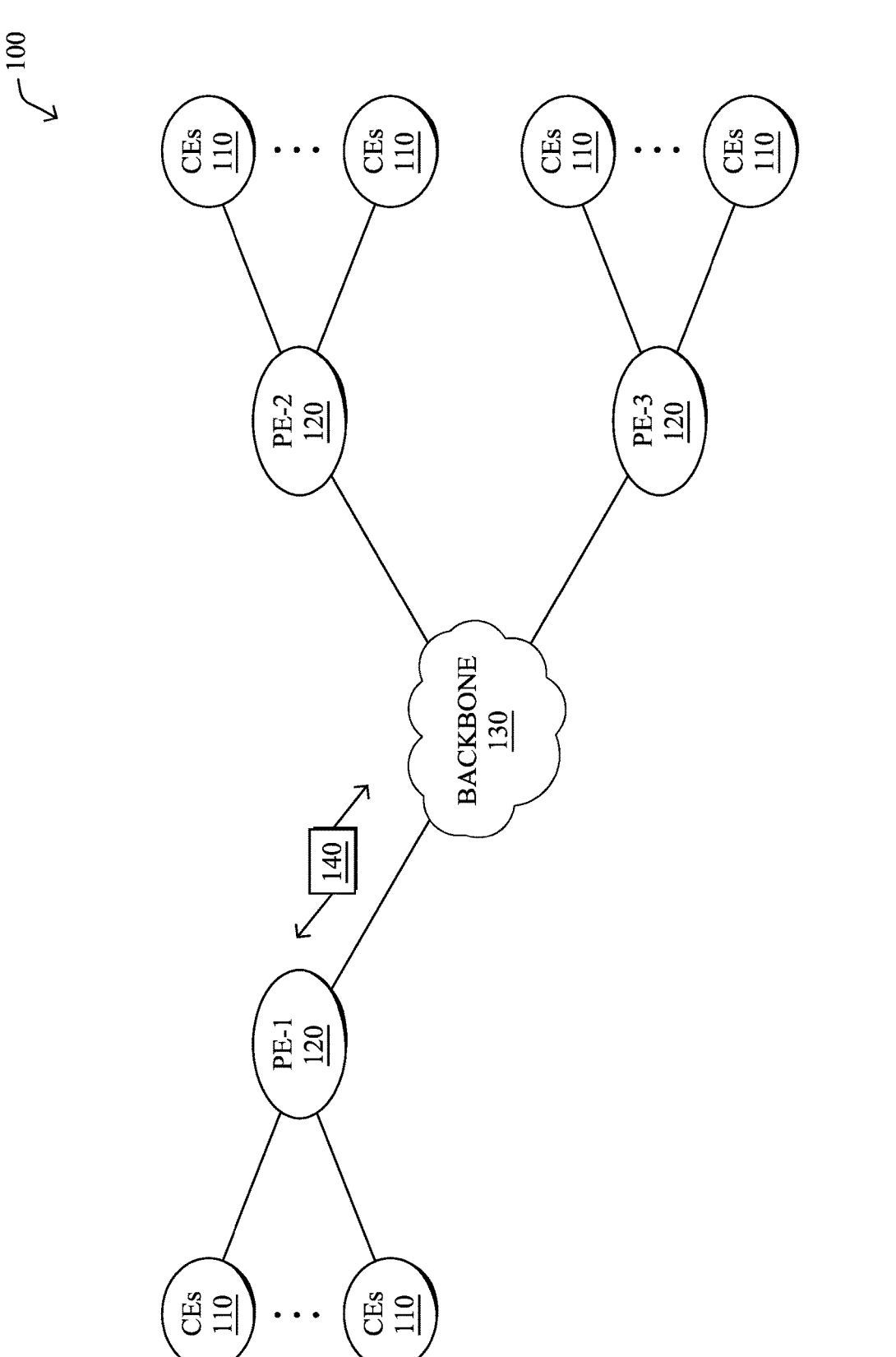
FIGS. 1A-1B illustrate an example communication network.

According to one or more embodiments of the disclosure, a device in a network detects an encrypted traffic flow associated with a client in the network. The device captures contextual traffic data regarding the encrypted traffic flow from one or more unencrypted packets associated with the client. The device performs a classification of the encrypted traffic flow by using the contextual traffic data as input to a machine learning-based classifier. The device generates an alert based on the classification of the encrypted traffic flow.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate net81work node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
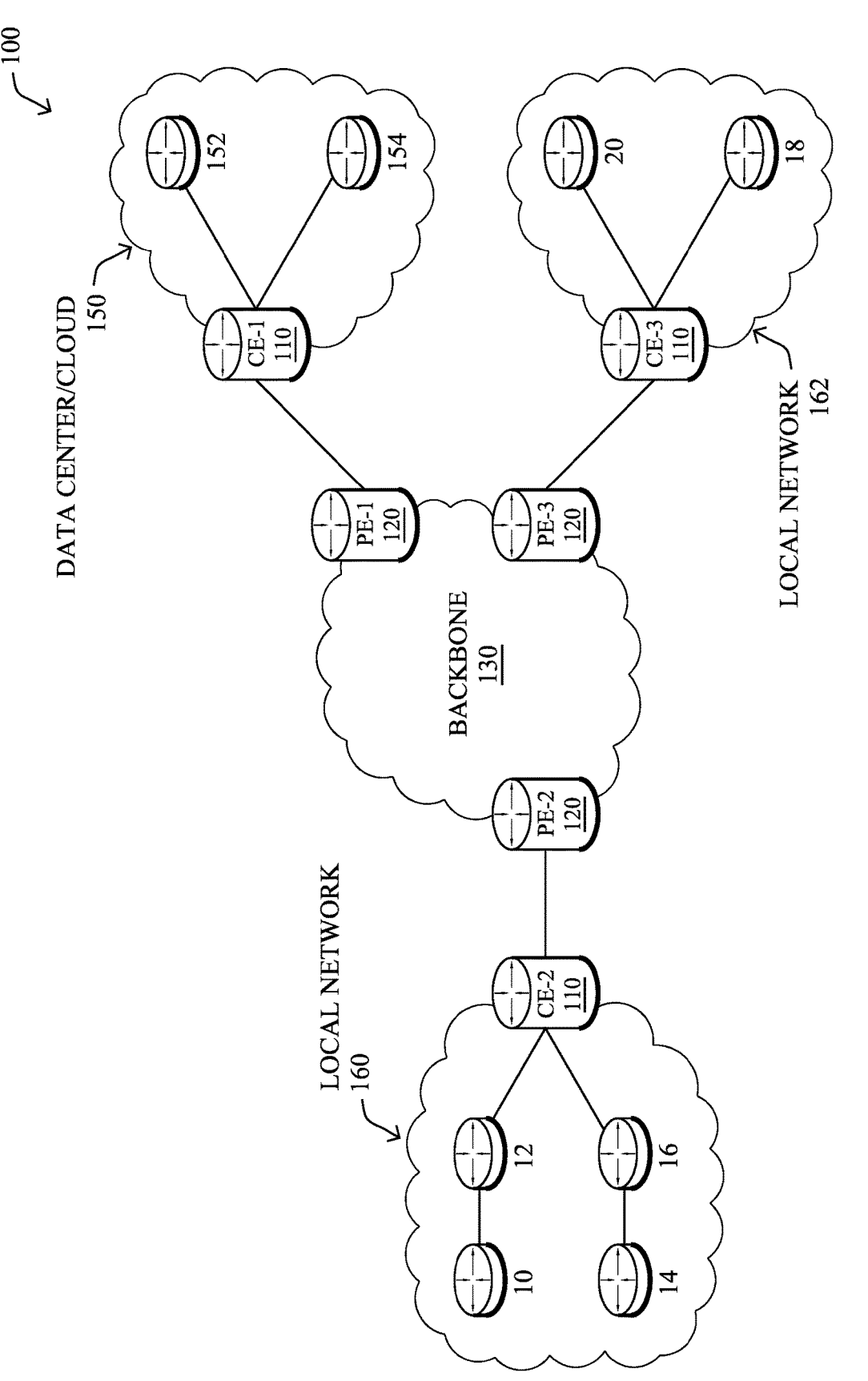

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
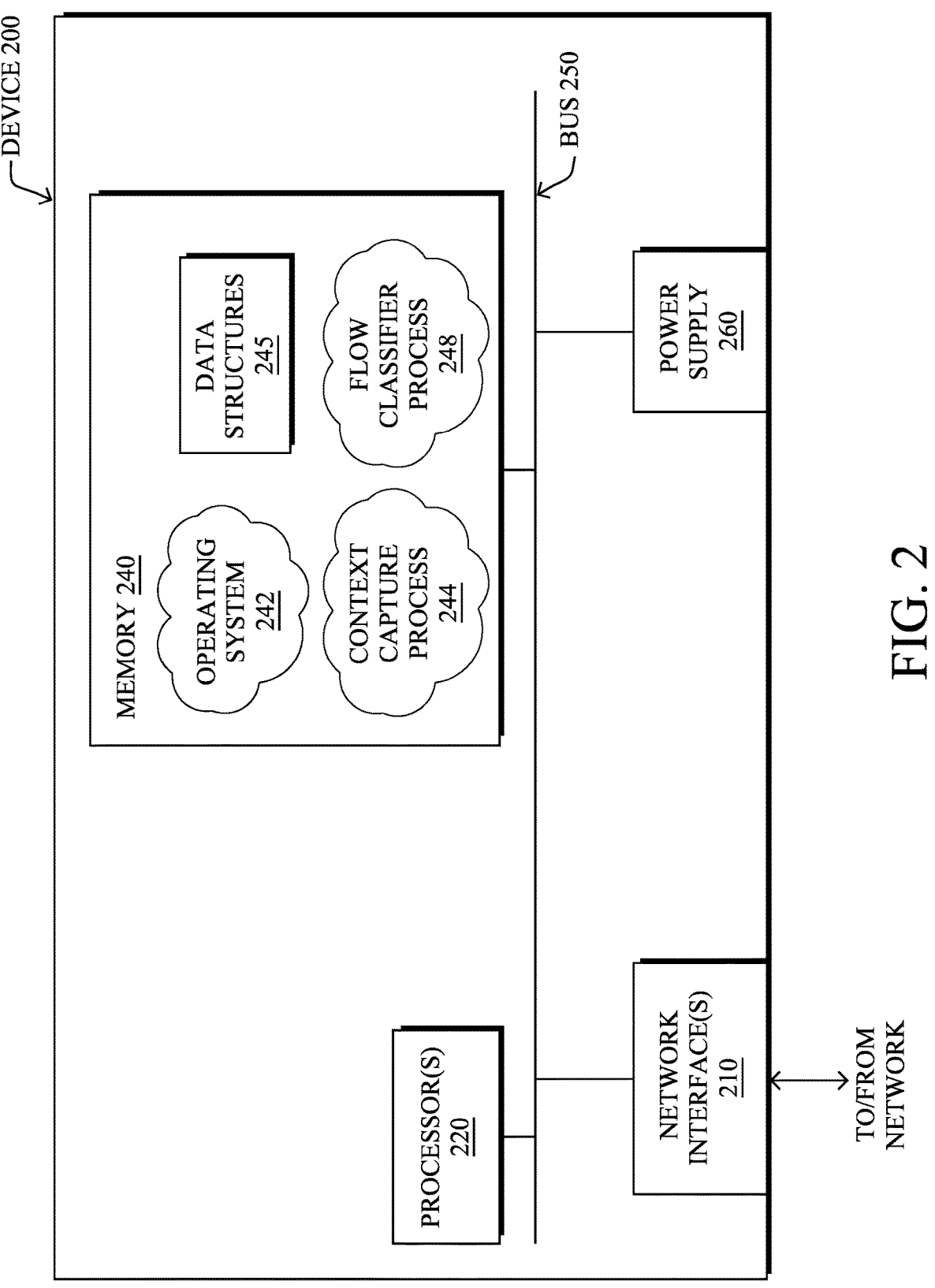
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise context capture process 244 and/or a flow classifier process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, context capture process 244 may be configured to capture contextual traffic flow data related to an encrypted traffic flow of interest. For example, if the encrypted traffic flow is associated with a particular host in the network, context capture process 244 may capture any other (e.g., unencrypted traffic) also associated with that client. In turn, context capture process 244 may provide the captured traffic/packets to classifier process 248 for analysis.

In general, classifier process 248 may execute one or more machine learning-based classifiers to classify encrypted traffic in the network for any number of purposes. In one embodiment, classifier process 248 may assess captured traffic data to determine whether a given traffic flow or set of flows are caused by malware in the network. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DOS) attack, combinations thereof, or the like. In further embodiments, classifier process 248 may classify the gathered traffic data to detect other anomalous behaviors (e.g., malfunctioning devices, misconfigured devices, etc.), traffic pattern changes (e.g., a group of hosts begin sending significantly more or less traffic), or the like.

Classifier process 248 may employ any number of machine learning techniques, to classify the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, classifier process 244 can use the model M to classify new data points, such as information regarding new traffic flows in the network. Often, M is a statistical model, and the cost function is inversely proportional to the likelihood of M, given the input data.

In various embodiments, classifier process 248 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that classifier process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, classifier process 248 may assess the captured traffic data on a per-flow basis. In other embodiments, classifier process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
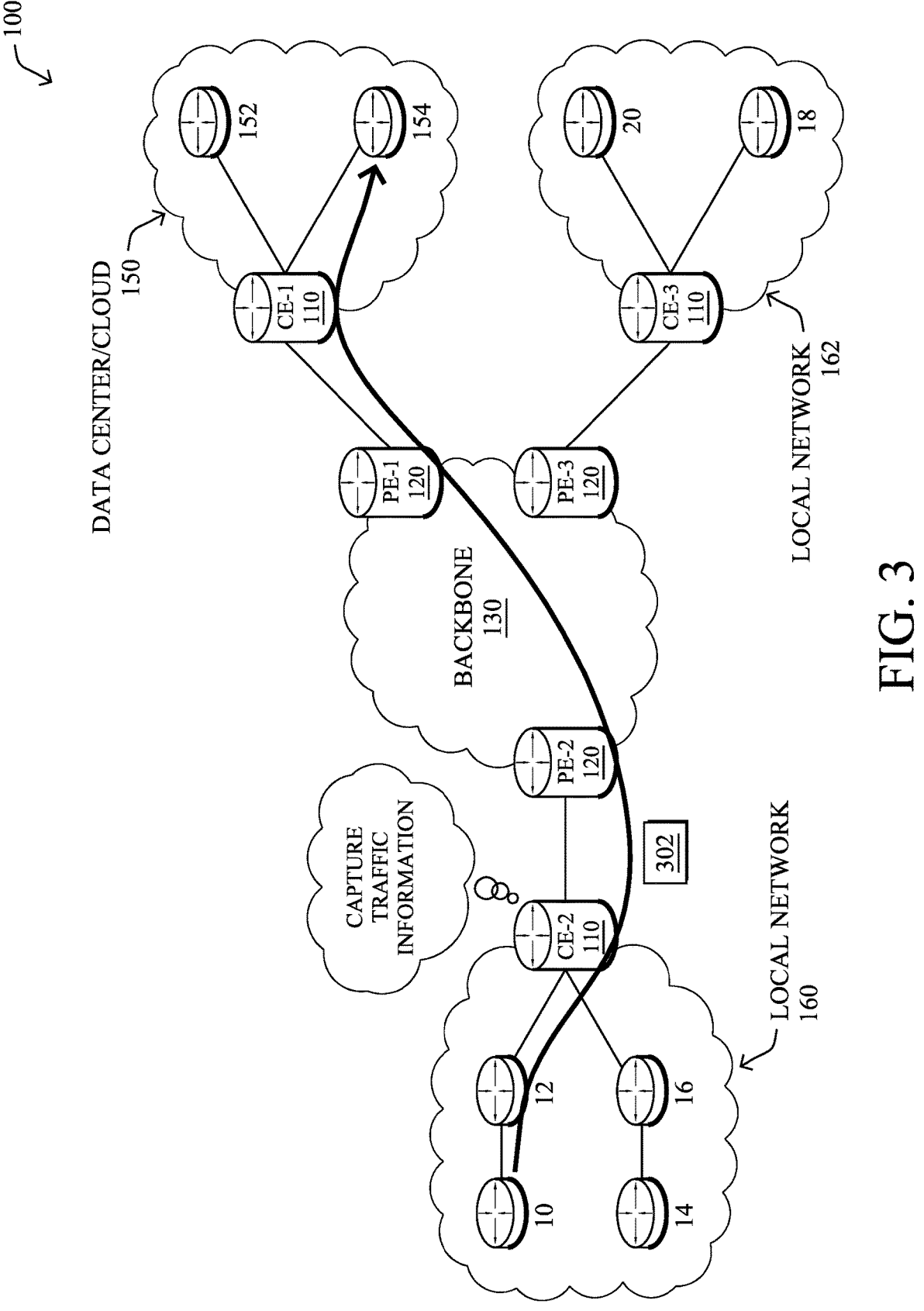
FIG. 3 illustrates an example of a network device capturing traffic data.

As shown in FIG. 3, various mechanisms can be leveraged to capture information about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows.

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, encryption in network traffic, and in data such as files that transit networks, is rapidly increasing. This poses major challenges with respect to visibility and threat detection because certain technologies, such as deep packet inspection (DPI), cannot be applied to encrypted traffic. In terms of visibility, being able to detect encrypted traffic over unconventional ports, such as DNS, could indicate out-of-policy tunnels or data exfiltration. More specifically, the detection of cryptographic protocols independent of the ports being utilized gives valuable knowledge to network administrators. In terms of threat detection, characterizing encrypted traffic as malicious has numerous benefits and would allow network administrators to identify when encrypted files transit the network using non-encrypted protocols such as the Hypertext Transfer Protocol (HTTP), which is another data exfiltration method.

It may be possible to use a man-in-the-middle approach to decrypt and inspect encrypted network traffic. For example, a proxy between a client device and a server may act as an intermediary to obtain the cryptographic information needed to decrypt the traffic. However, such approaches are often cumbersome, raise a number of privacy concerns, and may even be prohibited by law in some jurisdictions.

Analyzing Encrypted Traffic Behavior Using Contextual Traffic Data

The techniques herein allow for the analysis and classification of encrypted network traffic behavior using contextual traffic data. For example, the techniques herein can be used to compare and contrast HTTP Secure (HTTPS)/Transport Layer Security (TLS) traffic flows associated with a particular client with HTTP traffic also associated with the client, to assess the encrypted traffic flow. In particular, the techniques herein can be used to extract contextual traffic data from the HTTP flows, to better assess the behavior of the HTTPS/TLS flows, thereby enabling better detection of malware and threats concealed in the encrypted traffic. Further aspects of the techniques herein provide for various approaches to the capture of the unencrypted flows (e.g., HTTP flows, etc.) from the client, which are also referred to generally herein as the "local context" of the encrypted flow of interest.

Specifically, according to one or more embodiments of the disclosure, a device in a network detects an encrypted traffic flow associated with a client in the network. The device captures contextual traffic data regarding the encrypted traffic flow from one or more unencrypted packets associated with the client. The device performs a classification of the encrypted traffic flow by using the contextual traffic data as input to a machine learning-based classifier. The device generates an alert based on the classification of the encrypted traffic flow.

Illustratively, the techniques described herein may be performed by hardware, software, and/or firmware, such as in accordance with the flow classifier process 248, which may include computer executable instructions executed by the processor 220 (or independent processor of interfaces 210) to perform functions relating to the techniques described herein, e.g., in conjunction with context capture process 244.

Operationally, the techniques herein leverage the traffic related to an encrypted traffic flow of interest (e.g., associated with the same client, etc.), to produce a richer representation of the encrypted traffic for analysis. When used in conjunction with a malware classifier, this additional context may significantly increase the accuracy of the classifier. For example, the system may capture and analyze HTTP traffic that is related to HTTPS or TLS traffic of interest.

Figures 4A, 4B:
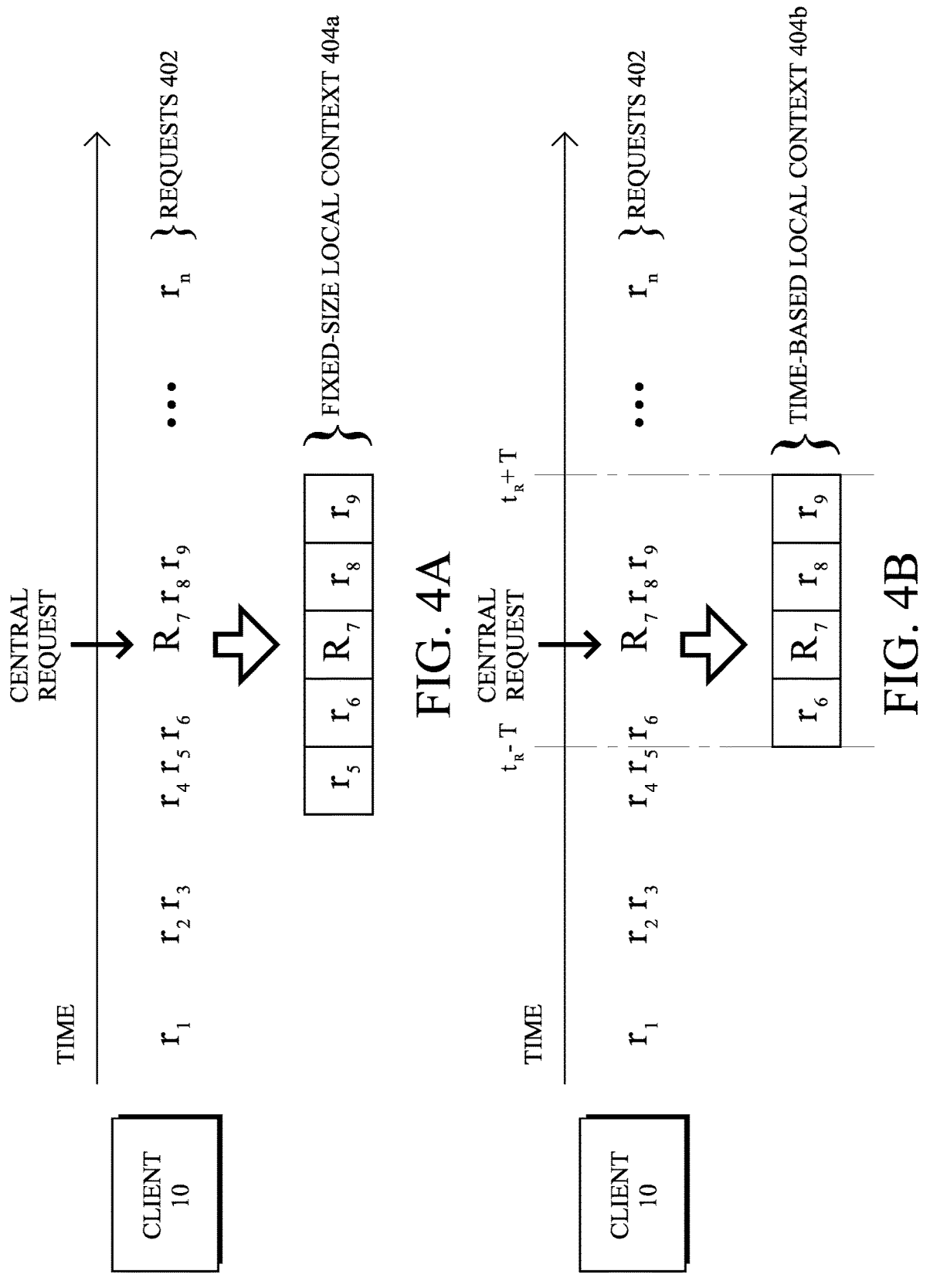
FIGS. 4A-4C illustrate examples of the capture of local contextual traffic data.
Figure 4C:
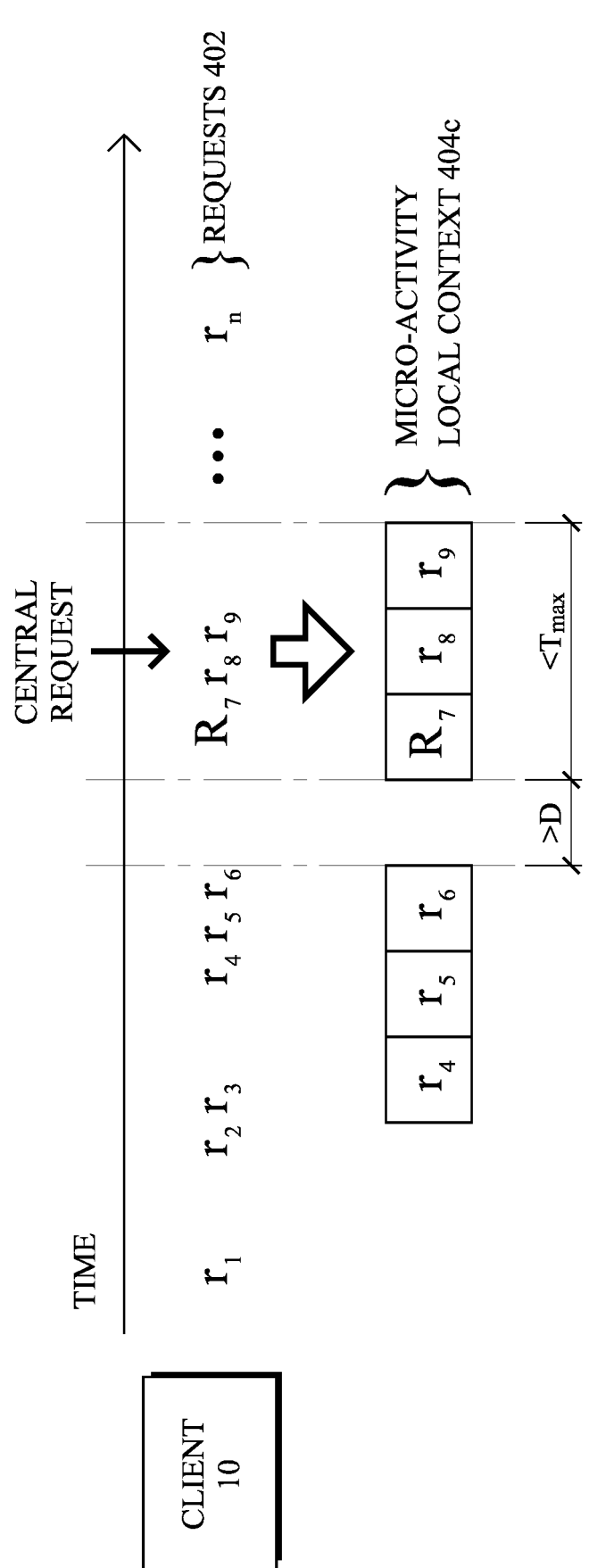

FIGS. 4A-4C illustrate examples of the capture of local contextual traffic data, according to various embodiments. As shown in FIG. 4A, assume that client device 10 sends out n-number of requests 402 via the network over the course of time. In turn, an intermediate device in the network (e.g., router CE-2 shown in FIG. 3, another router, switch, IPS, firewall, etc.) may capture the corresponding packets of requests 402 for analysis.

To illustrate the operation of the context capture mechanism (e.g., context capture process 244), the notion of a local context of an encrypted traffic flow is introduced. For example, assume that request $R_7$ in the sequence of requests 402 sent by client device 10 is an encrypted HTTPS request for an encrypted traffic flow of interest. Notably, client device 10 may send request $R_7$ to a web proxy, to establish an encrypted TLS tunnel through which the encrypted data will be sent. In such a case, the "local context" of request $R_7$ may refer to all of the other requests 402 issued by client device 10, such as other HTTP/HTTPS request. Hence, the principle of a local context can be viewed as a sliding window moving on a time series of HTTP/HTTPS requests of each user device or, alternatively, individual users. This allows the analysis device to represent request $R_7$ and its corresponding encrypted flow in terms of its local context, not just from request $R_7$ itself.

In particular, request $R_7$ may be referred to as a "central request," while the remaining requests 402 in the local context of $R_7$ may be referred to as "context requests." This helps to gather additional information about the encrypted traffic as the other requests 402 issued close to each other tend to be related. Particularly, the context of an encrypted connection to a legitimate site tends to differ from the context of an encrypted flow that is malware-generated. For example, the following observations may be made regarding the context of encrypted traffic flows:

The context of an encrypted flow that is benign may include traffic/packets regarding any or all of the following: certificate checks, social networks (e.g., a social networking "like" button, etc.), downloads of additional page resources (e.g., fonts, content data from various content delivery networks, etc.), advertisements, site analytics, and the like.

The context of an encrypted flow that is malicious, however, may include traffic/packets regarding any or all of the following: visits to various IP checking services, connection checks (e.g., to check whether a particular service is available, etc.), connections to sites with bad reputations, etc. In some cases, the context of a malicious flow can also be empty.

Three different examples of the capture of the local context for request $R_7$ are shown in FIGS. 4A-4C, although other capture approaches are possible in other implementations. In FIG. 4A, the capture mechanism may employ a fixed-size local context for request $R_7$. In FIG. 4B, the capture mechanism may instead employ a time-based local context. In FIG. 4C, the capture mechanism may employ a micro-activity based context that represents the micro-activities of client device 10. As would be appreciated, while the techniques shown in FIGS. 4A-4C are illustrated with respect to client-generated requests, the capture mechanism may capture other types of related flows, in other embodiments.

In FIG. 4A, the capture mechanism may parameterize the local context window using a predefined size parameter W. Such a parameter may be hard-coded, user-adjustable, or dynamically adjusted by the device based on any number of factors (e.g., available resources of the device, etc.). In one embodiment, W may define a fixed number of requests 402 issued by the same client device (e.g., client device 10) before and/or after the central request $R_7$ of interest. For example, the local context window for any given central request of interest may always be of size (2*W)+1, to include the W-number of requests sequentially prior to the central request, the central request itself, and the W-number of requests sequentially after the central request. In other embodiments, the number of requests 402 prior to central request $R_7$ that are considered to be context requests may differ from the number of requests 402 after central request that are considered to be context requests.

In the example shown, assume that the capture mechanism uses a fixed-size local context of five total requests: the two requests immediately prior to the central request, the central request itself, and the two requests immediately after the central request. Notably, the capture mechanism may determine that the local context for central request $R_7$ is the fixed-size local context 404a, which includes requests $r_5$, $r_6$, $R_7$, $r_8$, and $r_9$.

One advantage of representing the local context of the central request (e.g., the request associated with the encrypted flow) is that if the individual requests are represented by feature vectors of fixed size, the entire local context window can be also represented by a single feature vector of fixed size just by concatenating the feature vectors representing the requests within the window. Specifically, if each request is represented by a feature vector of dimension N, the local context window can be represented by a feature vector of dimension (2*W+1)*N. This simplifies the usage of this representation in various classifiers and anomaly detectors, as most of them are designed for input data of fixed dimension.

FIG. 4B illustrates another possible approach to capturing the local context of the central request. In some embodiments, the local context window may be parameterized by a time parameter T. For example, consider the same set of requests 402 sent by client device 10. Now, assume that the central request $R_7$ was sent by client device 10 at a time $t_R$ or such a time is otherwise associated with the central request (e.g., when the request was received by the intermediate device, etc.). In one embodiment, the local context for $R_7$ may include any of the requests associated with client device 10 that fall within the timespan of $[t_R{-}T; t_R{+}T]$. In other embodiments, the timespan may encompass different lengths of time before and after the central request. Thus, in contrast to a fixed-length local context, a time-based local context may include a variable number of requests.

By way of example, assume that the local context of request $R_7$ is defined to include all of the related requests that fall within the timespan of $[t_R{-}T; t_R{+}T]$. As shown, this gives way to a time-based local context 404b that includes requests $r_6$, $R_7$, $r_8$, and $r_9$. Since request $r_5$ is outside of the time window, however, it will not be included in time-based local context 404b, in contrast to the fixed-length local context 404a shown in FIG. 4A.

Because of the variable size of a time-based local context, the corresponding flow classifier(s) (e.g., flow classifier process 248) may be configured to assess the different instances instead of a fixed-size feature vector, as in the case of a fixed-size local context. For example, the classifiers/detectors may leverage multiple instance learning (MIL) techniques to accept sets of instances as input instead of single feature vectors. Doing so may also be more adaptive than a fixed-size approach, as it may be able to capture specific behavioral patterns of certain applications or malware.

FIG. 4C illustrates yet another potential approach to capturing the local context of the central request. In various embodiments, the capture mechanism may assess requests 402, to generate a local context for request $R_7$ that represents the micro-activity of client device 10. Such a context may represent a single action performed by the user of client device 10. In one embodiment, the capture mechanism may split request 402 into micro-activities based on the elapse of time between consecutive request 402. Therefore, the micro-activity may be viewed as a set of all requests of the user that have a time difference between consecutive requests that are smaller than a predefined time delta D.

To prevent having large micro-activities for users that generate large amounts of web requests with small time deltas, the capture mechanism may also assess requests 402 with respect to a maximum micro-activity duration threshold, $T_{max}$. Such a threshold may operate in a similar manner to the time-based local context described above, to impose a limit on the micro-activity. For example, as shown, assume that the time deltas between requests $r_4$, $r_5$, and $r_6$ are less than D, as is the case for requests $R_7$, $r_8$, and $r_9$. However, the time delta between requests $r_6$ and $R_7$ is greater than D, thereby indicating that the two groups of requests are part of different sets of micro-activity.

Further, as shown, the capture mechanism may impose a time threshold to any given set of micro-activity. Thus, regardless of whether the time delta between request $r_9$ and the next request is less than D, the capture mechanism may exclude the next request from the micro-activity that includes requests $R_7$, $r_8$, and $r_9$. In other words, the next request may have an associated time that is greater than $T_{max}$ from the time associated with request $R_7$. As the use of a time-based limit for micro-activity may result in the inclusion of a variable number of requests, a MIL-based classifier may be used. In further embodiments, the capture mechanism may instead impose a fixed-length size to the sets of micro-activity.

Figure 5:
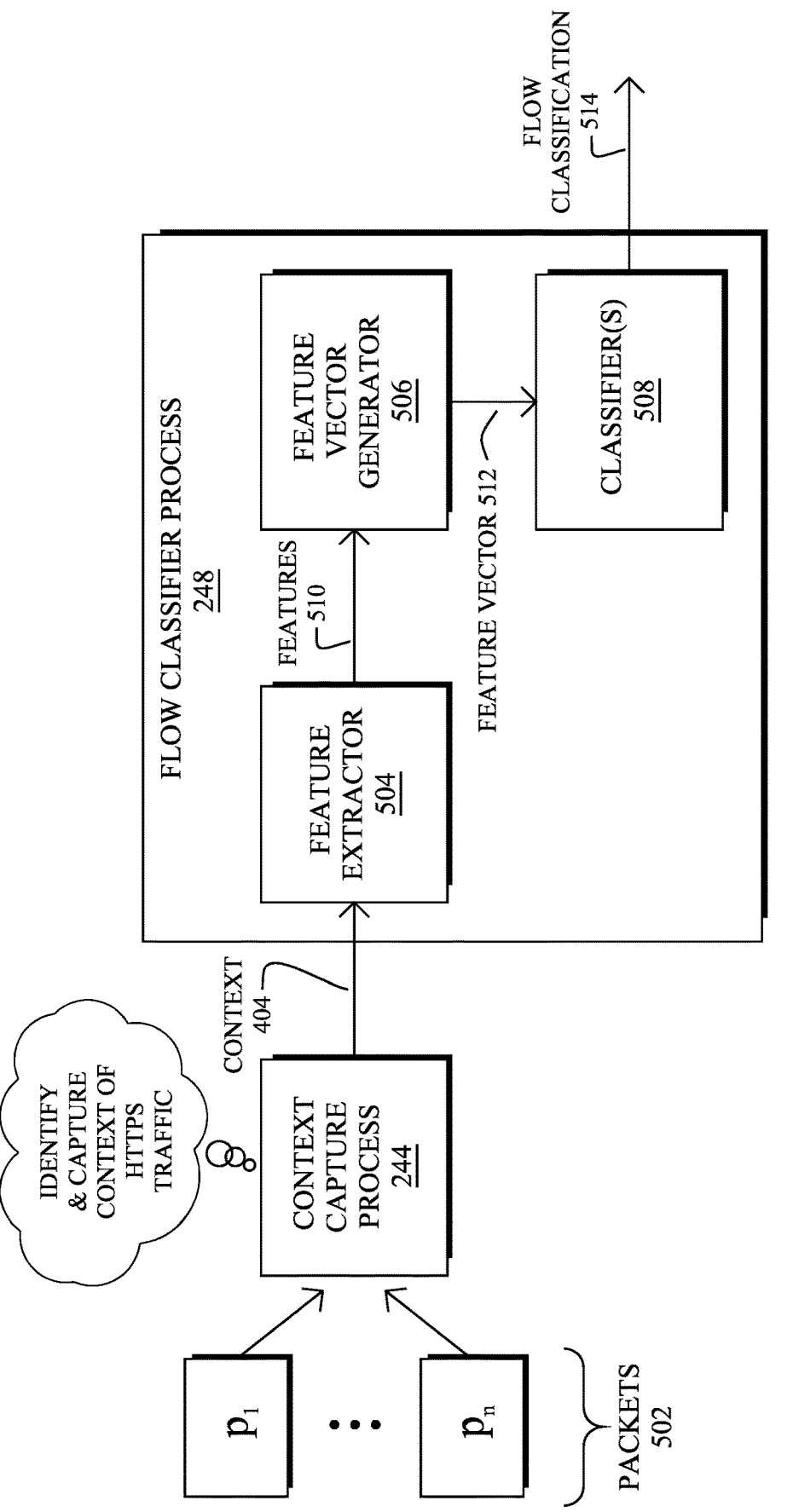
FIG. 5 illustrates an example architecture for classifying encrypted traffic.

Referring now to FIG. 5, an example architecture 500 for classifying encrypted traffic is shown, according to various embodiments. As shown, context capture process 244 may assess packets 502, to identify an encrypted traffic flow of interest. In turn, context capture process 244 may collect all related packets 502 to the packet/flow of interest. For example, certain packets may be related to the encrypted flow of interest based on the packets being sourced by the same client address in the network. These packets are then included in the captured context 404 that is provided to flow classifier process 248 for analysis. As noted above, context capture process 244 may employ any number of different techniques to capture context 404 (e.g., a fixed-length approach, a time-based approach, a micro-activity approach, etc.). For example, if context capture process 244 identifies a TLS flow, it may capture all of the HTTP flows form the same source address within a short time window of the TLS flow (e.g., 5 minutes, etc.).

In some embodiments, flow classifier process 248 may include a feature extractor 504 sub-process that extracts the features of interest from captured context 404. For example, feature extractor 504 may parse and record any or all of the available header fields and values of the packets 502 associated with context 404 (e.g., from the HTTPS flow of interest and the related HTTP flows). Example fields may include, but are not limited to, outbound and inbound HTTP fields, Content-Type, User-Agent, Accept-Language, Server, and code. In some cases, feature extractor 504 may simply represent the presence of a certain header field as a binary value (e.g., "1" if present and "0" if not present). In other embodiments, feature extractor 504 may extract the actual values of the fields.

Notably, feature extractor 504 may record header information that would otherwise be discarded by web proxy logs. Such logs only report on a fixed subset of all headers, and normalize the values that are reported, discarding valuable data. For instance, the only HTTP-specific data features available in the exported IIS 6.0 web server logs are the Method, URI, code, User-Agent, Referrer, Cookie, and Host. Of these, only the first four are enabled by default in IIS 6.0. In contrast, feature extractor 504 may capture traffic information regarding any number of different header fields and may also capture information such as the capitalization or ordering of the fields.

In one embodiment, feature extractor 504 may additionally attempt to infer the values of certain header fields of the TLS/HTTPS traffic of interest. For example, feature extractor 504 may leverage any number of techniques to infer the user-agent field of the encrypted traffic of interest. Such a technique may use, e.g., machine learning to determine which user-agent is associated with the encrypted traffic flow based on which cipher suite is advertised.

In a further embodiment, feature extractor 504 may also make comparisons across the different fields, to generate additional features. For example, feature extractor 504 may compare the user-agent field of HTTP traffic in context 404 to an inferred user-agent from the encrypted traffic, as another data point for analysis.

Flow classifier process 248 may also include a feature vector generator 506 that receives the extracted features 510 from feature extractor 504 and uses the extracted information to build supervised machine learning-based classifiers 508. Such classifiers 508 may be trained, for example, by providing sample feature vectors 512 from the local context of encrypted flows that are known to be either benign or malicious (e.g., malware-generated, etc.). In other cases, such as when the feature vectors would be of different sizes due to a time-based capture mechanism, classifiers 508 may instead be MIL-based, to assess the different instances.

In one example, assume that feature vector generator 506 constructs feature vector 512 as a set of binary variables representing all of the observed HTTP headers in the HTTP flows of context 404 that can be correlated to the TLS flow of context 404. If any of the HTTP flows have a specific header value, then that feature may be a "1" regardless of the other HTTP flows. In turn, the machine learning-based classifier(s) 508 may assess the input feature vector 512 to classify the encrypted flow of interest, thereby generating a flow classification 514. Classification 514 can then be used to initiate any number of mitigation actions, if the flow is deemed malicious or suspicious. For example, classification 514 may trigger an alert to an administrator, may cause a networking device to block or flag traffic from the client device, or take any number of other actions.

Preliminary testing was performed using seven types of features from the HTTP data related to an encrypted flow. For each feature, all specific values were selected used by at least 11% of either the malware-generated or benign samples and an "other" category. The HTTP types were the presence of outbound and inbound HTTP fields, Content-Type, User-Agent, Accept-Language, Server, and Code header fields. Using these features, in addition to the TLS specific features (e.g., a byte distribution, a sequence of packet lengths and times metric, etc.), gave a 0.00% false discovery rate (FDR) accuracy of 99.956%. The TLS-only features only had a 0.00% FDR accuracy of 77.881%.

As a concrete example, 125 malicious TLS flows were observed that had associated HTTP flows with a User-Agent string=Firefox/31.0. All TLS flows in this set offered the prototypical Windows XP cipher suite list, provided by the Windows SChannel implementation in Windows XP. 97 DMZ TLS flows were also found that had associated HTTP flows with a User-Agent string=Firefox/31.0. Of note is that Firefox/31.0 uses NSS 3.16.2 as its TLS library. And, while the cipher suite list offered in the DMZ traffic was not an exact match to what NSS 3.16.2 uses by default, it is significantly closer to NSS 3.16.2 than to the Windows SChannel implementation with respect to the offered cipher suites and order of the cipher suites. While such an analysis approach is not immune to false positives, it does offer a unique way to identify indicators of compromise that arise when correlating HTTP and TLS flow data.

Further preliminary testing was performed to evaluate one week of proxy logs from twelve different companies. Various infections using encrypted traffic were identified in their traffic, such as: ad-injectors, faked browser plugins, Necrus Trojan, and others. A random forest classifier was also trained via boosting on 9 companies and tested on the rest, in the 4-fold cross-validation manner. In the first case, only features extracted from central request were presented to the random forest classifier. In the second case, features extracted from the central request and two preceding and two following requests were extracted and presented to the random forest classifier.

The above experiments were repeated ten times and the area under the resulting precision-recall curve was measured and averaged over the ten experiments on each fold. The results are illustrated below:

TABLE 1

| Fold | Central Request Only | with Local Context |
|------|---------------------|--------------------|
| fold1 | 0.455 | 0.998 |
| fold2 | 0.429 | 0.993 |
| fold3 | 0.929 | 0.992 |
| fold4 | 0.719 | 0.985 |

The results clearly show the performance boost of the classifier with context features.

While the use of context features has been shown to increase performance of classification-based analysis, further embodiments also provide for the use of the context features with anomaly-based analysis. Generally, anomaly detectors operate by learning a model of "normal" behavior and detecting behavioral changes that deviate from the model. Typically, such detectors use unsupervised learning and may be used either in a stand-alone fashion (e.g., as a separate anomaly detection process) or in conjunction with other processes (e.g., flow classifier process 248).

As noted above, there are three potential approaches to finding the context of a currently issued HTTP(S) request. For purposes of illustrating the anomaly detection techniques herein, the techniques are described with respect to the micro-activity approach to determining the context, although the other approaches can be used in other implementations. Generally, the anomaly detection techniques herein can be used even if the communication is encrypted (e.g., using TLS, etc.), because the presence of additional requests in the context will not be affected by the encryption.

In a first embodiment, the anomaly detection process may employ an "empty context detection" technique. Such a technique may look for HTTP(s) requests that have empty context (e.g., there are no other HTTP(s) requests issued by the user in the time-wise vicinity of the analyzed request). Such requests are not directly related to any action of the user. By chance, the malicious request can be issued at the same time that the user is actively browsing the web resulting in having nonempty context. Additionally, some of the requests sent to legitimate domains, which usually have a nonempty context, may sometimes appear with empty contexts (e.g., checking for updates of already downloading from a site). To address these issues, the detector may model the floating mean of the context sizes for each domain that was visited by any user from the controlled network, in one embodiment. The floating mean is then updated with every new observation, capturing long term estimate of the context size for each modelled domain.

In particular, the anomaly detection process may calculate the anomaly score of each domain d as $a(d)=\exp(-csm(d))$, where the $csm(d)$ is the floating mean of the context sizes of the domain d. This means that requests to a domain with empty or small contexts will have high anomaly whereas a domain that has more requests with nonempty context will have a small anomaly score.

In a second embodiment, the anomaly detection process may employ a "common context" detection technique. Notably, some malware may generate additional HTTP(s) requests that accompany the command and control botnet requests, resulting in non-empty contexts of the command and control requests. Examples may be IP checks (e.g., visiting whatsmyip.com and similar sites), downloading advertisements (e.g., advertisement injectors), etc.

To be able to detect this type of behavior, the anomaly detection process may model the most common domains that are in the context. Then, if the context of the request includes domains that are commonly occurring in contexts of a number of different domains, the anomaly detection process may label the request as normal (e.g., to well-known domains such as advertisement-related domains, social media domains, etc.). However, if the domains in the context of the current request do not appear in the context of any other domain, the anomaly detection process may label the request as anomalous.

In some embodiments, the anomaly detection process may build and constantly update an estimate of the probability of a domain d being a context domain (e.g., a domain that typically occurs in a context of many other domains). The probability P(d is context domain) may be estimated as P(d is context domain)=number of all unique domains that had the domain d in its context/maximum size of the context over all domains d. In turn, the anomaly detection process may calculate the anomaly score of the current request as a logarithm of the estimated probability.

Both of the anomaly detection techniques described above could produce a considerable amount of false positives. Therefore, the anomaly detection process may also filter out popular domains. In particular, if a domain is continuously used by a portion of the network users, it is less likely that the domain is involved in malicious activity. Thus, in some embodiments, the anomaly detection process may reduce the anomaly score of the popular domains by maintaining a model that includes a number of unique users for each domain observed in the data. The anomaly score is then reduced by the factor of users that use the domain. The higher the number of unique users, the lower the resulting anomaly score. The false positives may also be reduced by the above described popularity approach applied to Autonomous Systems, IP, destination country, etc.

FIG. 6 illustrates an example simplified procedure for analyzing encrypted traffic behavior using contextual traffic data, in accordance with one or more embodiments described herein. For example, a non-generic, specifically configured networking device (e.g., device 200) may perform procedure 600 by executing stored instructions (e.g., processes 244, 248). The procedure 600 may start at step 605, and continues to step 610, where the device detects an encrypted traffic flow associated with a particular client device in the network. For example, the device may identify a TLS or HTTPS traffic flow associated with the client (e.g., based on a request or packet sent by the client, etc.).

At step 615, as detailed above, the device may capture contextual traffic data regarding the encrypted flow. In some embodiments, such contextual traffic data may correspond to one or more unencrypted (e.g., HTTP) traffic flows that are related to the encrypted flow of interest. For example, the device may treat any HTTP packets sent by the source client of an HTTPS flow as part of the context of the HTTPS flow. The device may also take any number of different capture approaches, in various embodiments, such as a fixed-size approach, a time-based approach, or a micro-activity approach. From these additional packets/flows, the device may extract any number of different features or other contextual traffic data (e.g., by analyzing the header fields of the flows, etc.). In further embodiments, one or more other encrypted flows may also be used as additional context, in addition to the one or more unencrypted traffic flows.

At step 620, the device may perform a classification of the encrypted flow by using the contextual traffic data as input to a machine learning-based classifier, as described in greater detail above. Such a classifier may, for example, classify the encrypted traffic flow as being either malware-generated or benign, based on a training set of data from flows that are known to fall in one of the two classifications.

At step 625, as detailed above, the device may generate an alert based on the classification. For example, if the device determines that the encrypted traffic flow was malware-generated, the device may generate and provide an alert to a user interface (e.g., to alert an administrator) and/or to another networking device (e.g., to take corrective measures). Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the correlation of HTTP and TLS traffic flow, thereby improving the capabilities of a supervised machine learning-based classification of the encrypted traffic. In particular, the techniques allow for the correlated flows to be used to find discrepancies and generate indicators of compromise between the software on an endpoint and the software that is being advertised by the endpoint. Using this type of detailed HTTP data allows for a clearer network-based view of the software on the endpoint. Further, the techniques herein do not rely on a man-in-the-middle inspection of encrypted traffic, but instead use information from the requests in the local context of the encrypted connections. The techniques herein can also be implemented in conjunction with other sources of communication logs, such as IPFIX records, Netflow records, etc.

While there have been shown and described illustrative embodiments that provide for the use of contextual traffic data to classify encrypted traffic, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

detecting, at a device in a network, an encrypted traffic flow comprising one or more encrypted packets sent by a client in the network;

capturing, at the device, one or more initial packets of the encrypted traffic flow sent by the client, wherein at least one of the one or more initial packets is a packet captured as part of a local context and is determined based on information associated with a request by the client to initiate the encrypted traffic flow, wherein the local context comprises one or more packets from one or more additional traffic flows associated with the client that are distinct from the encrypted traffic flow;

performing, by the device, a classification of the encrypted traffic flow by using the one or more initial packets from both the encrypted traffic flow and the one or more additional traffic flows as input to a machine learning-based classifier, wherein the machine learning-based classifier uses information from the one or more additional traffic flows to characterize the encrypted traffic flow; and generating, by the device, an alert based on the classification of the encrypted traffic flow.

2. The method as in claim 1, wherein the machine learning-based classifier is trained using sample contextual traffic data for encrypted traffic flows that are known to be either benign or malicious.

3. The method as in claim 1, wherein the one or more initial packets comprise one or more HTTP Secure (HTTPS) packets.

4. The method as in claim 1, wherein capturing the one or more initial packets of the encrypted traffic flow is based on a predefined fixed-size set of packets: 1) sent sequentially before or after a request packet of the encrypted traffic flow, 2) sent by the client within a predefined timespan of the request packet of the encrypted traffic flow, or 3) associated with a predefined micro-activity performed by the client.

5. The method as in claim 4, wherein the predefined fixed-size set of packets defines a fixed number of requests issued by the client sequentially before or after a request packet of the encrypted traffic flow.

6. The method as in claim 4, wherein the predefined timespan defines a window within which the request packet of the encrypted traffic flow and at least one other request packet are issued by the client.

7. The method as in claim 4, wherein the predefined micro-activity represents an activity performed by a user of the client.

8. The method as in claim 1, wherein capturing the one or more initial packets of the encrypted traffic flow comprises:

extracting, by the device, header information from the one or more initial packets sent by the client; and constructing, by the device, a feature vector for input to the machine learning-based classifier based on the header information that is extracted.

9. The method as in claim 8, wherein the header information is extracted from one or more of: a content-type header field, a user-agent header field, an accept-language header field, a server header field, or a status-code header field.

10. An apparatus, comprising:

one or more network interfaces to communicate with a network;

a processor coupled to the one or more network interfaces and configured to execute one or more processes; and a memory configured to store a process that is executable by the processor, the process when executed operable to:

detect an encrypted traffic flow comprising one or more encrypted packets sent by a client in the network;

capture one or more initial packets of the encrypted traffic flow sent by the client, wherein at least one of the one or more initial packets is a packet captured as part of a local context and is determined based on information associated with a request by the client to initiate the encrypted traffic flow, wherein the local context comprises one or more packets from one or more additional traffic flows associated with the client that are distinct from the encrypted traffic flow;

perform a classification of the encrypted traffic flow by using the one or more initial packets from both the encrypted traffic flow and the one or more additional traffic flows as input to a machine learning-based classifier, wherein the machine learning-based classifier uses information from the one or more additional traffic flows to characterize the encrypted traffic flow; and generate an alert based on the classification of the encrypted traffic flow.

11. The apparatus as in claim 10, wherein the machine learning-based classifier is trained using sample contextual traffic data for encrypted traffic flows that are known to be either benign or malicious.

12. The apparatus as in claim 10, wherein the one or more initial packets comprise one or more HTTP Secure (HTTPS) packets.

13. The apparatus as in claim 10, wherein capturing the one or more initial packets of the encrypted traffic flow is based on a predefined fixed-size set of packets: 1) sent sequentially before or after a request packet of the encrypted traffic flow, 2) sent by the client within a predefined timespan of the request packet of the encrypted traffic flow, or 3) associated with a predefined micro-activity performed by the client.

14. The apparatus as in claim 13, wherein the predefined fixed-size set of packets defines a fixed number of requests issued by the client sequentially before or after a request packet of the encrypted traffic flow.

15. The apparatus as in claim 13, wherein the predefined timespan defines a window within which the request packet of the encrypted traffic flow and at least one other request packet are issued by the client.

16. The apparatus as in claim 13, wherein the predefined micro-activity represents an activity performed by a user of the client.

17. The apparatus as in claim 10, wherein capturing the one or more initial packets of the encrypted traffic flow comprises:

extracting header information from the one or more initial packets sent by the client; and constructing a feature vector for input to the machine learning-based classifier based on the header information that is extracted.

18. The apparatus as in claim 17, wherein the header information is extracted from one or more of: a content-type header field, a user-agent header field, an accept-language header field, a server header field, or a status-code header field.

19. A tangible, non-transitory, computer-readable medium that stores program instructions that cause a device in a network to execute a process comprising:

detecting, at the device, an encrypted traffic flow comprising one or more encrypted packets sent by a client in the network;

capturing, at the device, one or more initial packets of the encrypted traffic flow sent by the client, wherein at least one of the one or more initial packets is a packet captured as part of a local context and is determined based on information associated with a request by the client to initiate the encrypted traffic flow, wherein the local context comprises one or more packets from one or more additional traffic flows associated with the client that are distinct from the encrypted traffic flow;

performing, by the device, a classification of the encrypted traffic flow by using the one or more initial packets from both the encrypted traffic flow and the one or more additional traffic flows as input to a machine learning-based classifier, wherein the machine learning-based classifier uses information from the one or more additional traffic flows to characterize the encrypted traffic flow; and generating, by the device, an alert based on the classification of the encrypted traffic flow.

20. The tangible, non-transitory, computer-readable medium as in claim 19, wherein capturing the one or more initial packets of the encrypted traffic flow is based on a predefined fixed-size set of packets: 1) sent sequentially before or after a request packet of the encrypted traffic flow, 2) sent by the client within a predefined timespan of the request packet of the encrypted traffic flow, or 3) associated with a predefined micro-activity performed by the client.

* * * * *